United States Patent [19]

Irwin et al.

[11] Patent Number: 5,580,073

[45] Date of Patent: Dec. 3, 1996

[54] TRANSPORTATION DOLLY

[76] Inventors: Brant W. Irwin, 412 Yale Avenue, E., Winnipeg, Manitoba, Canada, R2C 0J5; Ron G. Irwin, 962 Prince Rupert Avenue, Winnipeg, Manitoba, Canada, R2K 1W7

[21] Appl. No.: 394,501

[22] Filed: Feb. 27, 1995

[51] Int. Cl.⁶ .................................................... B62B 1/22
[52] U.S. Cl. ................................ 280/47.24; 280/47.315; 280/655
[58] Field of Search .................... 280/33.991, 33.997, 280/638, 639, 651, 652, 654, 655, 655.1, 43, 43.14, 43.15, 43.16, 87.05, 47.16, 47.17, 47.18, 47.24, 47.315, 47.34, 47.35, 47.36, 47.371, 47.131; 294/118; 414/459, 460, 461, 626

[56] References Cited

U.S. PATENT DOCUMENTS

| | | | |
|---|---|---|---|
| 1,679,107 | 7/1928 | Woldt | 280/47.23 |
| 4,648,778 | 3/1987 | Schultz | 414/460 |
| 5,364,147 | 11/1994 | Dickey et al. | 294/118 |

FOREIGN PATENT DOCUMENTS

| | | | |
|---|---|---|---|
| 2601424 | 7/1977 | Germany | 280/652 |
| 40459471 | 2/1992 | Japan | 280/47.16 |
| 17761 | 12/1905 | United Kingdom | 280/47.16 |

*Primary Examiner*—Richard M. Camby
*Assistant Examiner*—Frank Vanaman
*Attorney, Agent, or Firm*—Adrian D. Battison; Murray E. Thrift

[57] ABSTRACT

A transportation dolly for use with heavy objects which allows a single individual to grip and lift heavy objects positioned on the ground or other supporting surface, transport them to a new location, and then reposition them on the ground or other supporting surface at the desired new location, with reduced risk of injury, and to allow careful placing of the object in a particular location. The transportation dolly comprises a frame having ground wheel means for supporting the frame and handle means for manually propelling the frame, clamp means, a winch, and a winch support structure.

9 Claims, 4 Drawing Sheets

TRANSPORTATION DOLLY

FIELD OF THE INVENTION

The present invention provides a transportation dolly for lifting a heavy object off the ground, transporting the object, and placing the object at a desired location.

BACKGROUND

Gripping and lifting heavy objects positioned on the ground or other supporting surface, transporting them to a new location, and then repositioning them on the ground or other supporting surface at the desired new location can be difficult for a single individual to do manually, and can often require two or more individuals to do.

As well, moving around heavy objects can also be hazardous for a single individual's since the chance of an injury due to a fall occurring, or an injury due to excess strain on the individuals back or other body parts is high.

To compound this problem many heavy objects such as concrete side walk pads and curb stones require that they be placed carefully in a particular location. This often requires an individual work and place the object from a position that is not safe and can further increase the chance of injury.

A transportation dolly for use with heavy objects is needed which will allow a single individual to grip and lift heavy objects positioned on the ground or other supporting surface, transport them to a new location, and then reposition them on the ground or other supporting surface at the desired new location, with reduced risk of injury, and to allow careful placing of the object in a particular location.

SUMMARY

It is, one object of the present invention, therefore to provide a transportation dolly for use with heavy objects which allows a single individual to grip and lift heavy objects positioned on the ground or other supporting surface, transport them to a new location, and then reposition them on the ground or other supporting surface at the desired new location, with reduced risk of injury, and to allow careful placing of the object in a particular location.

According to the present invention there is provided a transportation dolly for use with heavy objects comprising; a frame having ground wheel means for supporting the frame, and handle means for manually propelling the frame; clamp means arranged to engage for lifting a heavy object located beneath the frame; a winch having a winch actuation means, and an elongate flexible connection means connected to the clamp means for raising and lowering the clamp means; and a winch support structure fixed to the winch for supporting the winch and connecting the winch to the frame.

Preferably the frame comprises a first frame section, a second frame section, a plurality of cross members connecting the first frame section to the second frame section. Each one of the plurality of cross members is removably and reengageably fixed at a first end to one frame section such that the first and second frame sections can be separated from one another for storage, and is pivotally connected at a second end to the other frame section such that the cross member can be pivoted into a position parallel to the second frame section.

Preferably the winch support structure includes removable and reengageable connection means for engaging the frame.

Preferably the handle means comprise a first and second handle fixed to the rear of the frame and is pivotally fixed near a bottom end, and removably and reengageably fixed at a position spaced upwards from the bottom end such that the handle can rotate to extend forward between the first and second frame sections for storage.

Preferably the ground wheel means are located on each frame section and comprise a ground wheel; a substantially vertical channel member; an axle fixed to the wheel at one end and the channel member at the other end, said channel member being sized and arranged to slide over the bottom end of the front leg; and removable and reengageable fixing means for fixing the channel in place to the front leg of the respective frame section. The channel member can be oriented such that the ground wheels lie either to a side of the respective frame section facing away from to the respective other frame section, or lie to a side of the respective frame section facing towards the respective other frame section.

Preferably each rear leg includes a skid plate fixed to the bottom end of the rear leg, said skid plate comprising a plate having upturned peripheral edges.

In the accompanying drawings, which illustrate an exemplary embodiment of the present invention:

BRIEF DESCRIPTION OF THE DRAWINGS

In the drawings like characters of reference indicate corresponding parts in the different figures.

DETAILED DESCRIPTION

Figure 1:
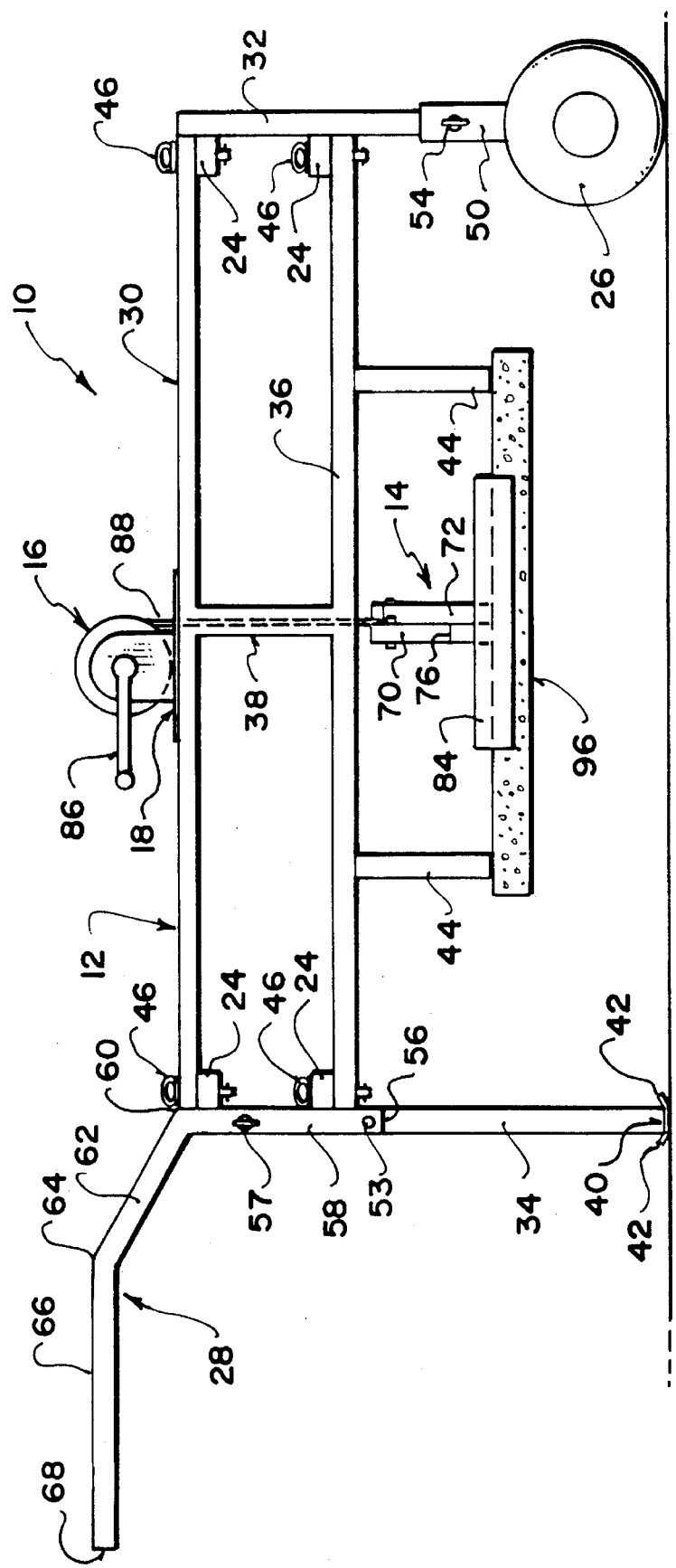
FIG. 1 is a side view of the transportation dolly.

Referring to FIG. 1 a preferred embodiment of the transportation dolly is shown generally at 10. The transportation dolly 10 comprises a frame 12, scissor clamp 14, a winch 16, and a winch support structure 18.

The frame 12 includes a first frame section 20, a second frame section 22, a plurality of cross members 24 connecting the first frame section to the second frame section, ground wheels 26 for supporting the frame, and handles 28 for manually propelling the frame.

Figure 2:
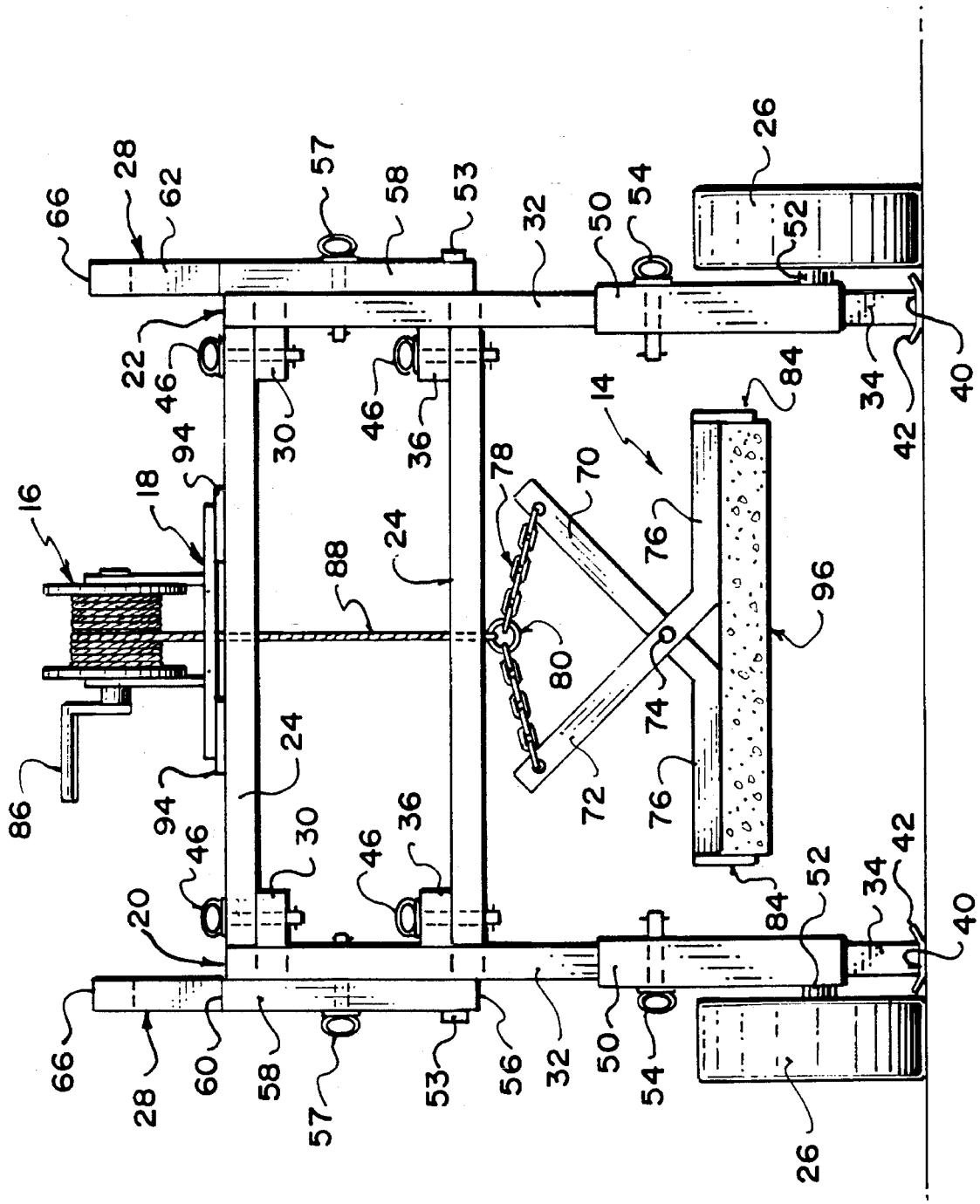
FIG. 2 is a front view of the transportation dolly.

Referring to FIGS. 1 and 2, each of the first and second frame sections 20 and 22 comprise a top rail 30, a front leg 32, a rear leg 34, a bottom rail 36, and a centre support 38. The top rail 30 is an elongate member oriented substantially horizontally and spaced upwards from the supporting surface. The front and rear legs 32 and 34 are elongate members each of which is fixed at a top end to the top rail. The front leg 32 is fixed to a front end of the top rail and projects downwards therefrom to a bottom end. Each front leg 32 includes a ground wheel 26 located at the bottom end of the leg. The rear leg 34 is fixed at a top end to a rear end of the top rail 30 and projects downwards therefrom to a bottom end. Each rear leg 34 includes a skid plate 40 fixed to the bottom end of the rear leg 34, said skid plate 40 comprises a plate having upturned peripheral edges 42. The bottom rail 36 is similar to and arranged parallel to the top rail 30 and is spaced a distance downwards therefrom. The bottom rail 36 is fixed at a front and rear end to the front and rear legs 32 and 34 respectively. The center support 38 is arranged between the top and bottom rails 30 and 36 spaced from the front and rear legs 32 and 34 and is fixed at a top end to the top rail 30 and at a bottom end to the bottom rail 36. The center support 38 adds rigidity to the frame sections.

Projecting downwards from the bottom rail 36 of each of the first and second frame sections is a plurality of stops 44. The stops 44 are spaced from one another and from the front and rear legs 32 and 34. The stops 44 are sized and arranged to engage the upper surface of the heavy object when the heavy object reaches a predetermined height during lifting to prevent further upward movement of the heavy object.

Figure 3:
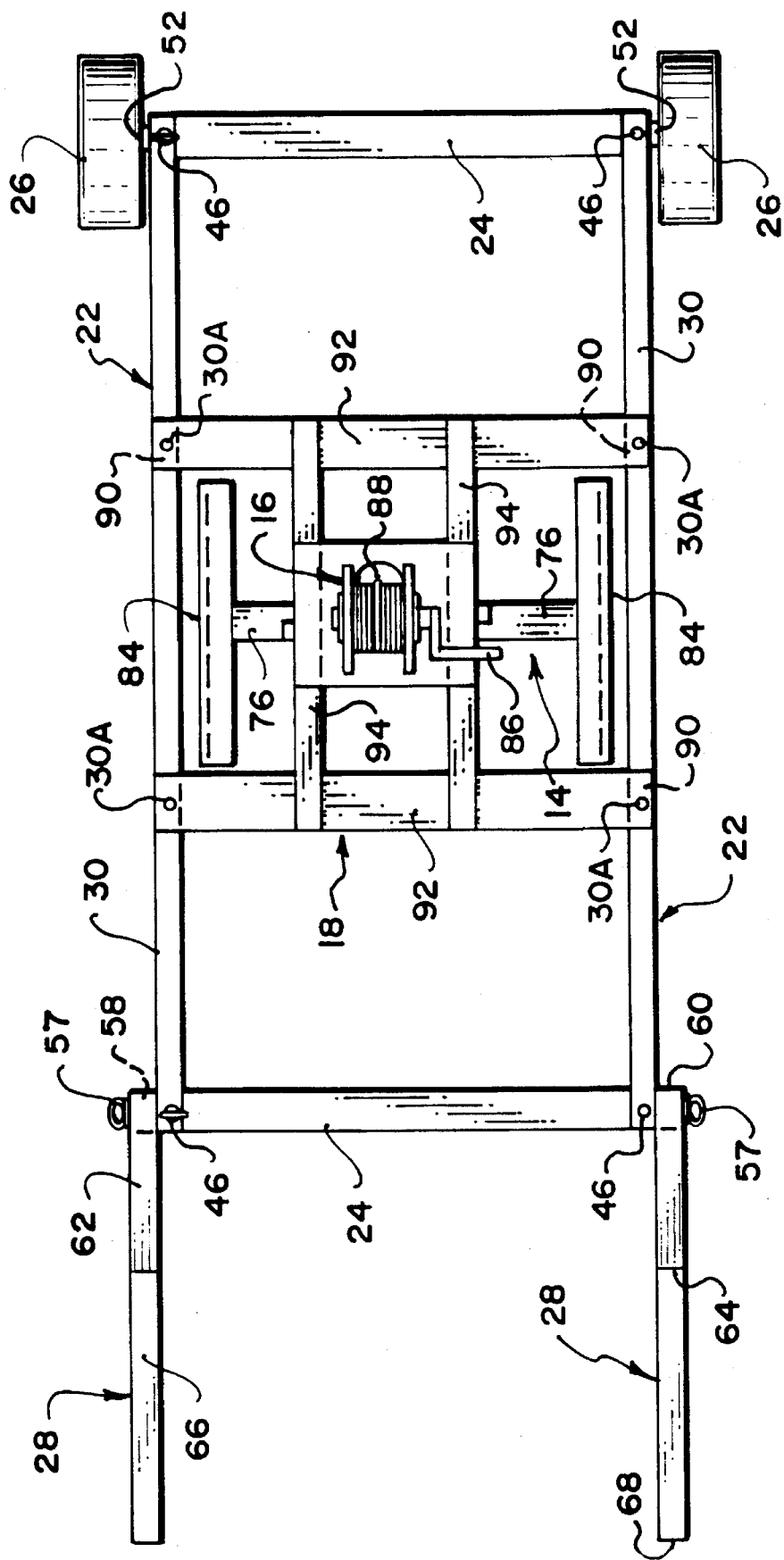
FIG. 3 is a top view of the transportation dolly.

Referring to FIGS. 1 and 3 each one of the plurality of cross members 24 is removably and reengageably fixed at a first end to one of the frame sections 20 and 22. In the preferred embodiment the removable and reengageable fixing means is a removable pin type connection 46. This allows the first and second frame sections 20 and 22 to be separated from one another for storage by removing the pins. Each one of the plurality of cross members 24 is also pivotally connected 4 at a second end to the second frame section. This allows the cross member to be pivoted into a position parallel to and substantially in the same plane as the second frame section thereby reducing the amount of space required store the frame section.

The ground wheels 26 are located on each frame section 20 and 22 and include the ground wheel 26, a substantially vertical channel member 50, and an axle 52. The axle 52 is fixed to the wheel 26 at one end and the channel member 50 at the other end. The channel member 50 is sized and arranged to slide over the bottom end of the front leg 32 and includes removable and reengageable fixing means 54 for fixing the channel 50 in place on the front leg 32 of the respective frame section. Again in the preferred embodiment the removable and reengageable fixing means 54 is a removable pin type connection.

The channel member 50 can be oriented such that the ground wheels 26 lie to either side of the respective frame section, either lying between the first and second frame 20 and 22 sections or lying to the outside of the frame 12.

The handle means comprise a first and second handle 28 fixed to the rear of the frame 12. Each handle 28 is pivotally fixed 53 near a bottom end 56, and removably and reengageably fixed by a pin connection 57 at a position spaced upwards from the bottom end 56 such that the handle 28 can rotate to extend forward between the first and second frame sections 20 and 22 for storage. Each handle 28 is fixed to a respective frame section and has a handle upright portion 58 extending upwards from the handle bottom 56 to a top 60 and lying parallel and adjacent to the rear leg 34 of the frame section 12. A handle angle portion 62 extends upwards and rearwards from the top of the handle upright portion 58 away from the frame section to a top end 64 and a handle grab portion 66 extends generally horizontally away from the top end 64 of the handle angle portion 62 to a free end 68.

Figure 4:
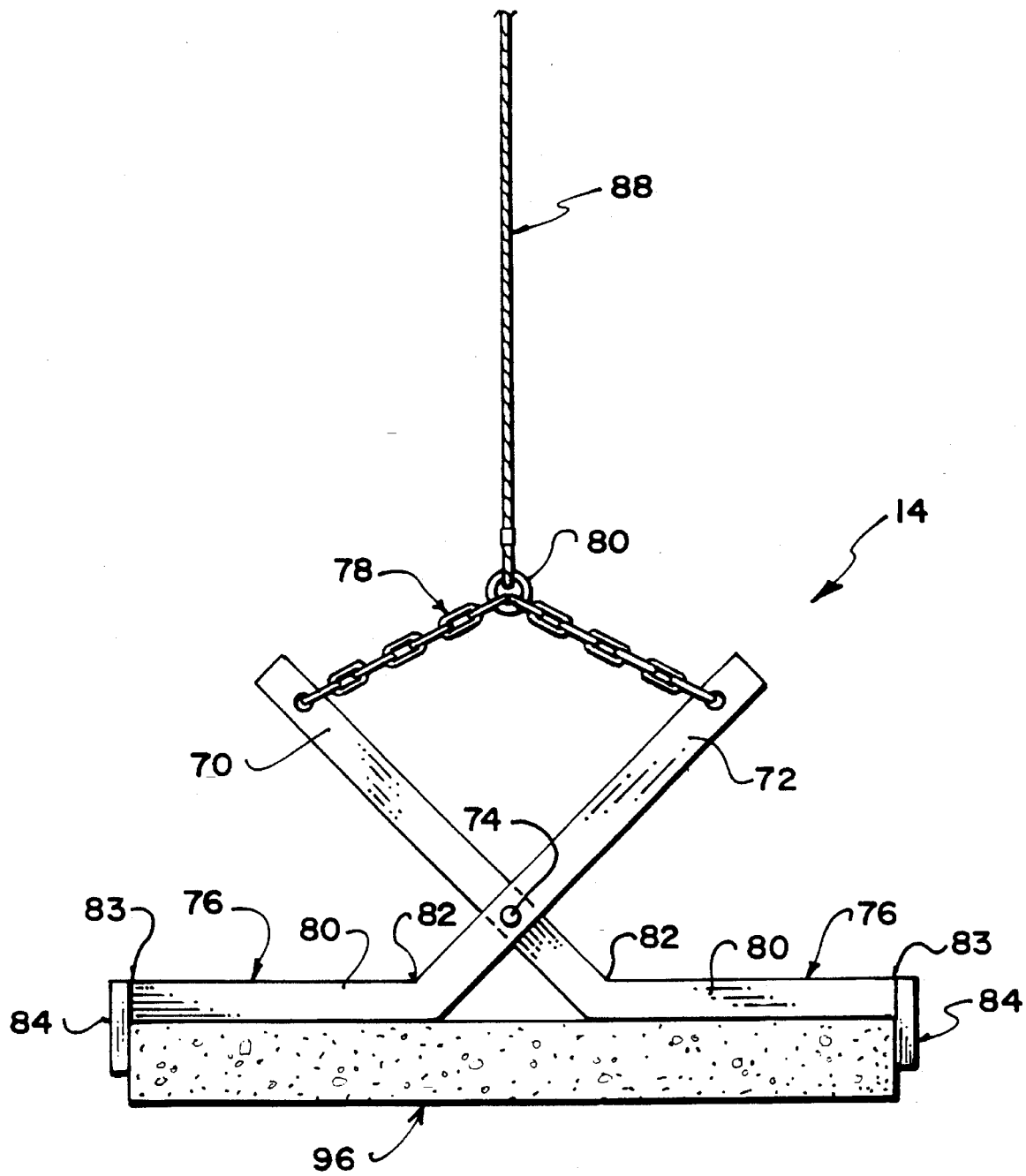
FIG. 4 is a front view of the scissor clamp.

Referring to FIG. 4 the scissor clamp 14 is arranged to engage the heavy object for lifting and is located beneath the frame 12 of the transport dolly. The scissor clamp 14 comprises a first scissor member 70 and a second scissor member 72 each having a top end and a bottom end and being pivotally connected to each other at a point 74 between their respective top and bottom ends. An engagement member 76 is arranged at the bottom of each scissor member to engage the heavy object, and a chain 78 is fixed at each of its ends to a respective top end of each of the scissor members 70 and 72. A cable coupling means 80 is fixed to the chain 78 for coupling the chain to the winch cable 88 such that actuation of the winch 16 causes an upwards and downwards force to be applied to the chain 78 and thereby an upwards movement of the clamp 14 means and inwards movement of the engagement members 76.

Each engagement member 76 comprises an elongate member 80 fixed at an angle to a respective scissor member 70 and 72. Each engagement member 80 is fixed to the scissor member 70 and 72 at a first end 82 and extends away from the scissor member 70 and 72 in a direction opposite to the other engagement member terminating at a free second end 83. A flange 84 projects downwards from the free second end 83 of the engagement member 76. The engagement members 76 are arranged above the top surface of the heavy object with the flanges 84 adjacent the sides of the heavy object for engaging the sides of said heavy object.

Referring to FIGS. 2 and 3 the winch 16 has winch actuation means 86, and a cable 88 connected to the scissor clamp 14 for raising and lowering the scissor clamp 14. The cable 88 extends from the winch 16 downwards and is fixed to a cable coupling means 80 on the chain 78 of the scissor clamp 14.

The winch 16 is located and fixed to the winch support structure 18. The winch support structure 18 lies in a horizontal plane, supports the winch 16, and connects the winch 16 to the frame by removable and reengageable connection means 90. The winch support structure 18 is arranged such that one side is connected to the top rail 30 of the first frame section 20 and a side opposite is connected to the top rail 30 of the second frame section 22.

The winch support structure 18 includes a pair of winch cross supports 92 arranged parallel to one another and perpendicular to the top rails 30 of the first and second frame sections 20 and 22 such that each end of each winch cross support 92 engages a respective top rail 30 and is attached thereto by a readily releasable of the coupling 30A. A pair of winch support members 94 are spaced apart from one another and arranged parallel to each other and perpendicular to the winch cross supports 92 such that each end of each winch support member 94 engages a respective winch cross support 92. The winch 16 is fixed to the winch support members 94.

In use the transportation dolly 10 is moved by the operator into a position over the object to be moved, for example a concrete side walk pad 96, such that the scissor clamp 14 is located roughly over the centre of the object. The scissor clamp 14 is then lowered by operating the winch actuating mechanism 86 which lowers the clamp 14. When the clamp 14 contacts the surface of the pad 96 or the supporting surface tension is released in the winch cable 88 thereby allowing the scissor members 70 and 72 to open.

The operator positions the scissor clamp 14 on the top surface of the concrete pad with the flanges 84 positioned adjacent the sides of the pad 96. The scissor clamp 14 is then raised by operating the winch actuating mechanism 86 which raises the clamp 14 and at the same time closes the scissor members 70 and 72 causing the clamp to engage the sides, grip, and lift the pad 96. The clamp 14 and pad 96 are raised until the top of the pad contacts the stops 44 on the bottom side of the bottom rail 36. The pad 96 is then held by tension in the winch cable 88 securely against the stops 44 thereby preventing swinging of the pad 96 during movement of the dolly 10.

The dolly 10 is then moved such that the pad is positioned above the desired location. When in position the scissor clamp 14 is lowered by operating the winch actuating mechanism 86 and lowering the clamp 14. When the pad 96 contacts the supporting surface tension is released in the cable 88 allowing the scissor members 70 and 72 to open and release the pad 96. The dolly 10 is then be moved away and the process repeated if desired. The dolly when used in this manner allows the operator to move heavy objects with ease and place them accurately in position without risking undue stain or injury.

Various additional embodiments can be used to move various types of heavy objects other than the concrete pads used as an example above.

While one embodiment of the present invention has been described in the foregoing, it is to be understood that other embodiments are possible within the scope of the invention. The invention is to be considered limited solely by the scope of the appended claims.

I claim:

1. A transportation dolly for use with a heavy object comprising:

a frame having ground wheel means for supporting the frame and handle means for manually propelling the frame;

clamp means arranged to engage the heavy object located beneath the frame for lifting the heavy object;

a winch having a winch actuation means, and a winch cable connected to the clamp means for raising and lowering the clamp means;

and a winch support structure fixed to the winch for supporting the winch and connecting the winch to the frame;

the frame including a first side frame section, a second side frame section and a plurality of cross members connecting the first side frame section to the second side frame section;

the winch support structure being arranged so as to extend between the first frame section and the second frame section and including connection means for connecting the winch support structure to the first and second frame sections, the connection means being arranged such that the winch support structure is readily removable and re-engageable with the first and second frame sections;

each of the plurality of cross members being removably and reengageably fixed at a first end to said first frame section;

such that the first frame section can be collapsed relative to the second frame section for storage and transportation.

2. A transportation dolly in accordance with claim 1 wherein each one of the plurality of cross members is pivotally connected at a second end to the second frame section such that each cross member can be pivoted into a position parallel to the second frame section.

3. A transportation dolly in accordance with claim 1 wherein each of the first and second frame sections comprises:

an elongate top rail;

an elongate front leg fixed at a top end to a front end of the top rail and projecting downwards therefrom to a bottom end;

an elongate rear leg fixed at a top end to a rear end of the top rail and projecting downwards therefrom to a bottom end;

a bottom rail arranged parallel to the top rail and spaced a distance downwards therefrom and being fixed at a front and rear end to the front and rear legs respectively;

and a center support arranged between the top and bottom rails spaced from the front and rear legs and being fixed at a top end to the top rail and at a bottom end to the bottom rail.

4. A transportation dolly in accordance with claim 1 wherein each of the first and second frame sections includes a plurality of stop members projecting downwards therefrom, said stop members being sized and arranged to engage an upper surface of the heavy object during lifting to prevent further upward movement of said heavy object.

5. A transportation dolly in accordance with claim 1 wherein the winch support structure lies in a horizontal plane.

6. A transportation dolly in accordance with claim 1 wherein the heavy object comprises a generally flat pad having a horizontal top surface and two opposed vertical side surfaces and wherein the clamp means comprises:

a scissor clamp having a first scissor member and a second scissor member each having a top end and a bottom end and being pivotally connected to each other at a point between their respective top and bottom ends;

an engagement member arranged at the bottom of each scissor member to engage the heavy object;

means connecting the top end of each of the scissor members to the winch cable such that actuation of the winch causes an upwards movement of the scissor clamp and inwards movement of the engagement members;

each engagement member comprising:

a substantially horizontal elongate member having a first end and a second end with the first end being fixed to the respective scissor member at an angle thereto, the engagement members extending in opposed directions across the top surface of the heavy object to the second end;

and a substantially vertical flange plate projecting downwards from the second end of the engagement member;

the flange plates being parallel so as to engage the opposed parallel side surfaces of the heavy object.

7. A transportation dolly in accordance with claim 1 wherein the handle means comprises a pair of handles and wherein each handle is pivotally fixed to a respective one of the side frame sections such that each handle can rotate from a fixed carrying position to extend forwardly alongside the first and second frame sections for storage and transportation.

8. A transportation dolly for use with a heavy object comprising a generally flat pad having a horizontal top surface and two opposed vertical side surfaces, the dolly comprising:

a frame having ground wheel means for supporting the frame and handle means for manually propelling the frame;

clamp means arranged to engage the heavy object located beneath the frame for lifting the heavy object;

and lifting means mounted on the frame and connected to the clamp means by connecting means for raising and lowering the clamp means relative to the frame;

the clamp means comprising:

a scissor clamp having a first scissor member and a second scissor member each having a top end and a bottom end and being pivotally connected to each other at a point between their respective top and bottom ends;

an engagement member arranged at the bottom of each scissor member to engage the heavy object;

the connecting means being connected to the top end of each of the scissor members such that actuation of the lifting means causes an upwards movement of the scissor clamp and inwards movement of the engagement members;

each engagement member comprising:

a substantially horizontal elongate member having a first end and a second end with the first end being fixed to the respective scissor member at an angle thereto, the engagement members extending in opposed directions across the top surface of the heavy object to the second end;

and a substantially vertical flange plate projecting downwards from the second end of the engagement member;

the flange plates being parallel so as to engage the opposed parallel sides of the heavy object.

9. A transportation dolly for use with a heavy object having a horizontal top surface comprising:

a frame having ground wheel means for supporting the frame and handle means for manually propelling the frame;

clamp means arranged to engage the heavy object located beneath the frame for lifting the heavy object;

a winch having a winch actuation means, and an elongate flexible connection means connected to the clamp means for raising and lowering the clamp means;

a winch support structure connecting the winch to the frame;

and a plurality of stop members mounted on the frame and projecting downwards therefrom, said stop members being sized and arranged to engage the horizontal top surface of the heavy object during lifting to prevent further upward movement of the heavy object.

\* \* \* \* \*